United States Patent [19]
Graham

[11] Patent Number: 5,260,664
[45] Date of Patent: Nov. 9, 1993

[54] NETWORK MONITOR AND TEST APPARATUS

[75] Inventor: Martin H. Graham, Berkeley, Calif.

[73] Assignee: Tutankhamon Electronics, Inc., Pleasant Hill, Calif.

[21] Appl. No.: 4,638

[22] Filed: Jan. 12, 1993

Related U.S. Application Data

[63] Continuation of Ser. No. 731,634, Jul. 17, 1991, abandoned.

[51] Int. Cl.$^5$ .............................................. G08B 23/00
[52] U.S. Cl. .................................... 324/522; 324/523; 324/527; 375/10; 379/26; 379/30; 340/509; 340/514
[58] Field of Search ............... 340/514, 509, 508, 506, 340/516; 379/26, 30; 324/543, 539, 527, 522, 523

[56] References Cited

U.S. PATENT DOCUMENTS

| | | | |
|---|---|---|---|
| 3,284,704 | 11/1966 | Lamont | 324/523 |
| 3,468,164 | 9/1969 | Sutherland | 340/509 |
| 3,626,282 | 12/1971 | Brewer | 324/536 |
| 3,706,927 | 12/1972 | Jedvall | 324/526 |
| 3,757,323 | 9/1973 | Pintell | 340/509 |
| 4,044,351 | 8/1977 | Everson | 340/514 |
| 4,314,199 | 2/1982 | Yamaura | 324/522 |
| 4,399,402 | 8/1983 | Pelletier | 324/525 |
| 4,400,663 | 8/1983 | May | 379/26 |
| 4,446,421 | 5/1984 | Berde | 324/523 |
| 4,651,084 | 3/1987 | Welsh | 324/523 |
| 4,760,379 | 7/1988 | De Phillipo | 340/509 |
| 5,086,293 | 2/1992 | Takahashi | 340/509 |
| 5,117,219 | 5/1992 | Tice | 340/514 |

FOREIGN PATENT DOCUMENTS

| | | | |
|---|---|---|---|
| 475745 | 7/1951 | Canada | 324/523 |
| 650149 | 2/1979 | U.S.S.R. | 324/509 |

*Primary Examiner*—Kenneth A. Wieder
*Assistant Examiner*—Jose M. Solis
*Attorney, Agent, or Firm*—Blakely, Sokoloff, Taylor & Zafman

[57] ABSTRACT

An apparatus for monitoring and testing a twisted pair, particularly useful for an Ethernet network. First and second DC currents alternated with one another are applied to both ends of the line, asynchronously. By monitoring the potential on the line, a determination is made as to the condition of the line. For example, shorted, crossed, improperly terminated or open conditions can be detected. A visual indication of the condition of the line is provided and additionally, the visual indication provides an indication of the traffic level in the network.

7 Claims, 6 Drawing Sheets

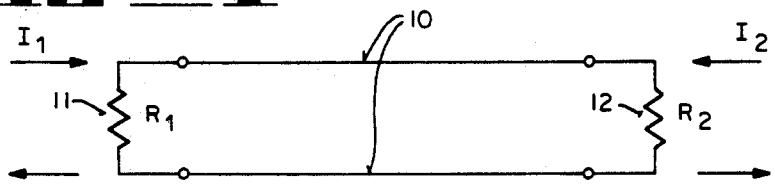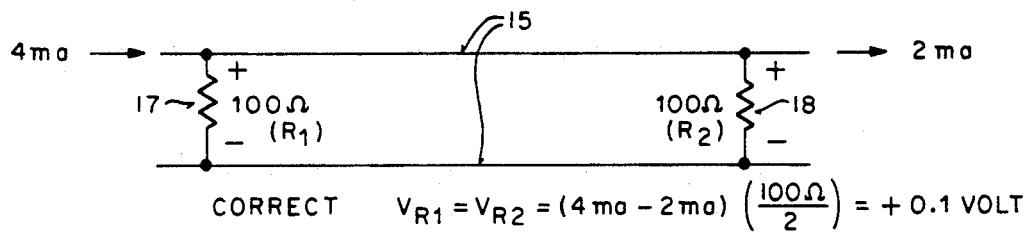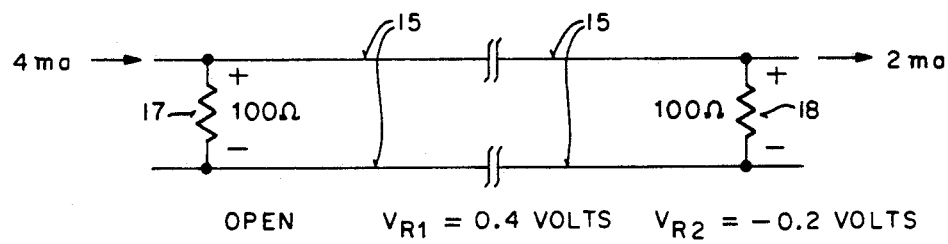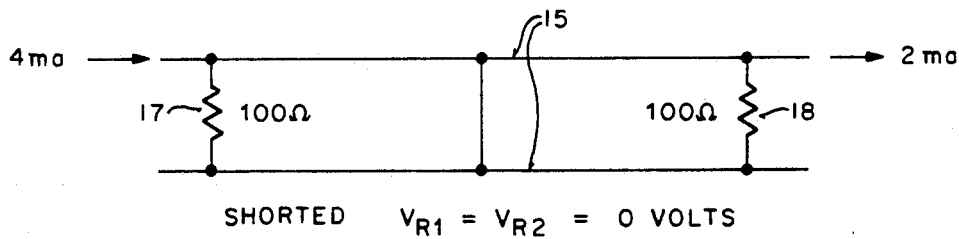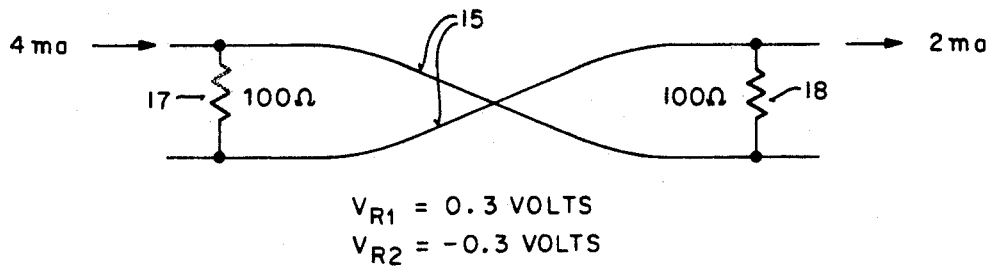

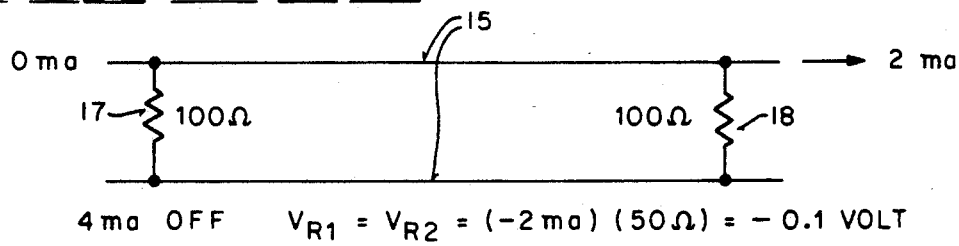
FIG_2E
4 ma OFF    $V_{R1} = V_{R2} = (-2\,ma)(50\,\Omega) = -0.1$ VOLT
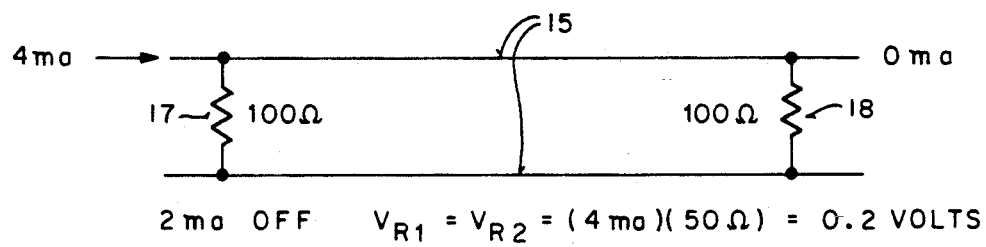
FIG_2F
2 ma OFF    $V_{R1} = V_{R2} = (4\,ma)(50\,\Omega) = 0.2$ VOLTS
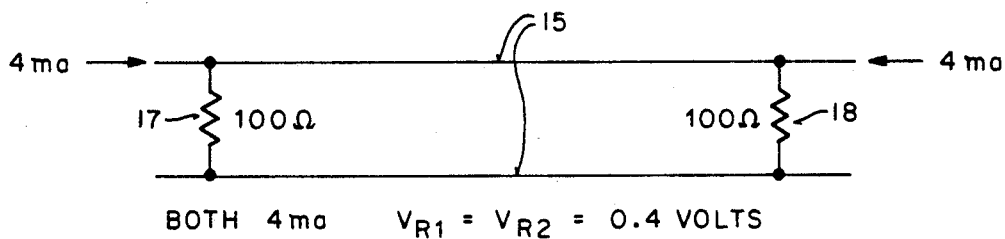
FIG_2G
BOTH 4 ma    $V_{R1} = V_{R2} = 0.4$ VOLTS
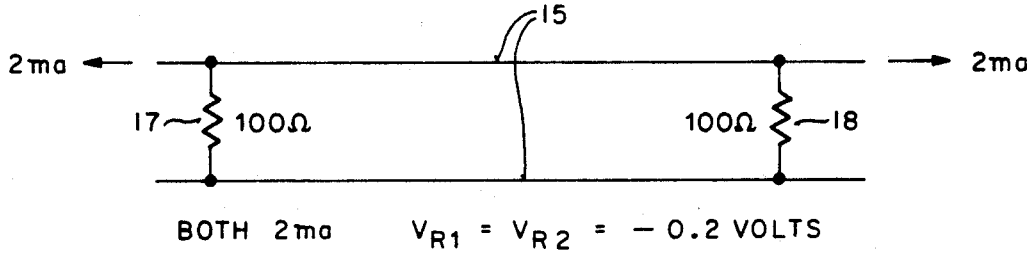
FIG_2H
BOTH 2 ma    $V_{R1} = V_{R2} = -0.2$ VOLTS
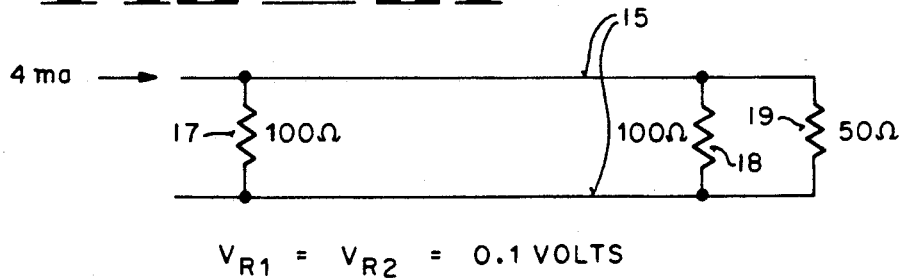
FIG_2I
$V_{R1} = V_{R2} = 0.1$ VOLTS

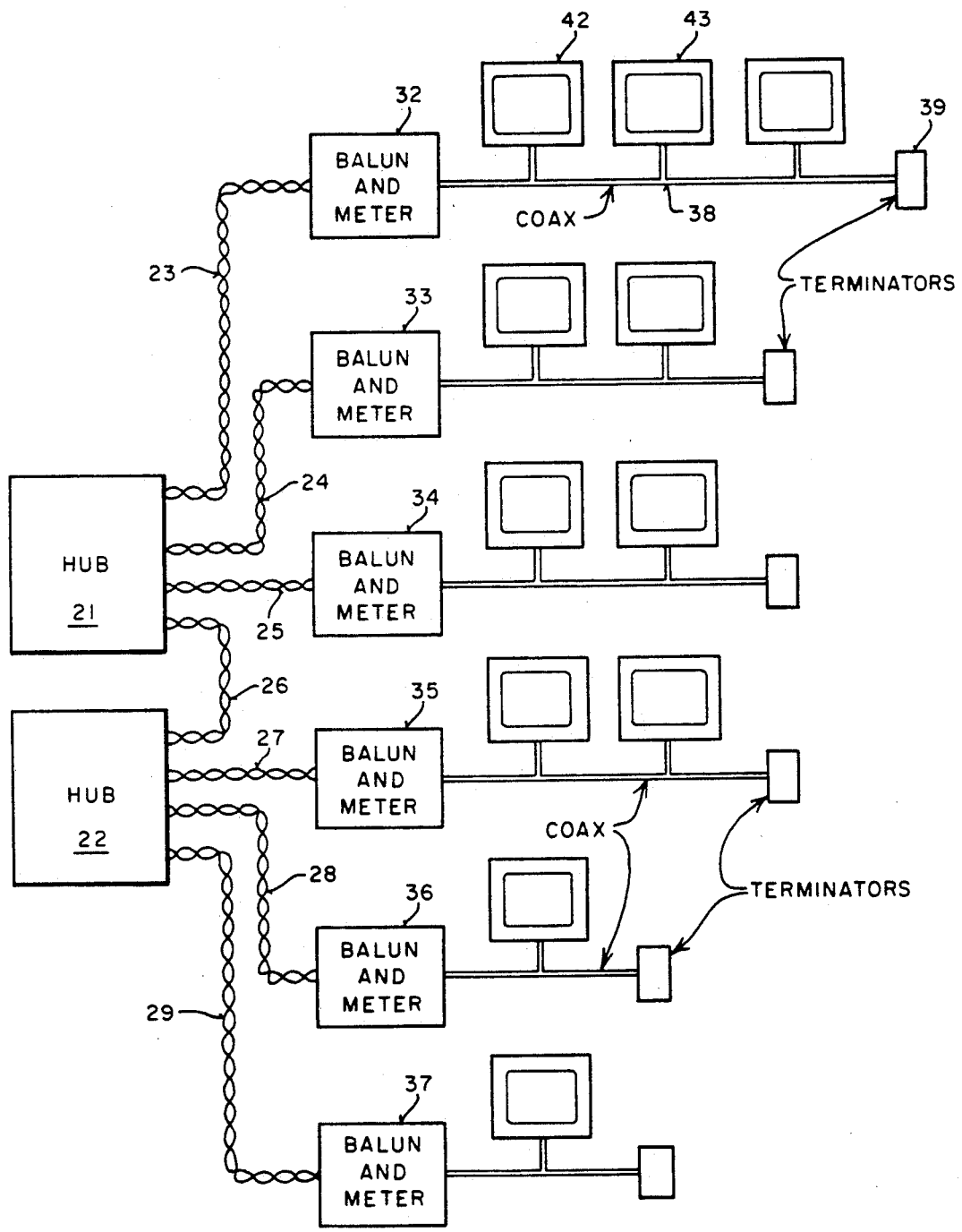
FIG_3

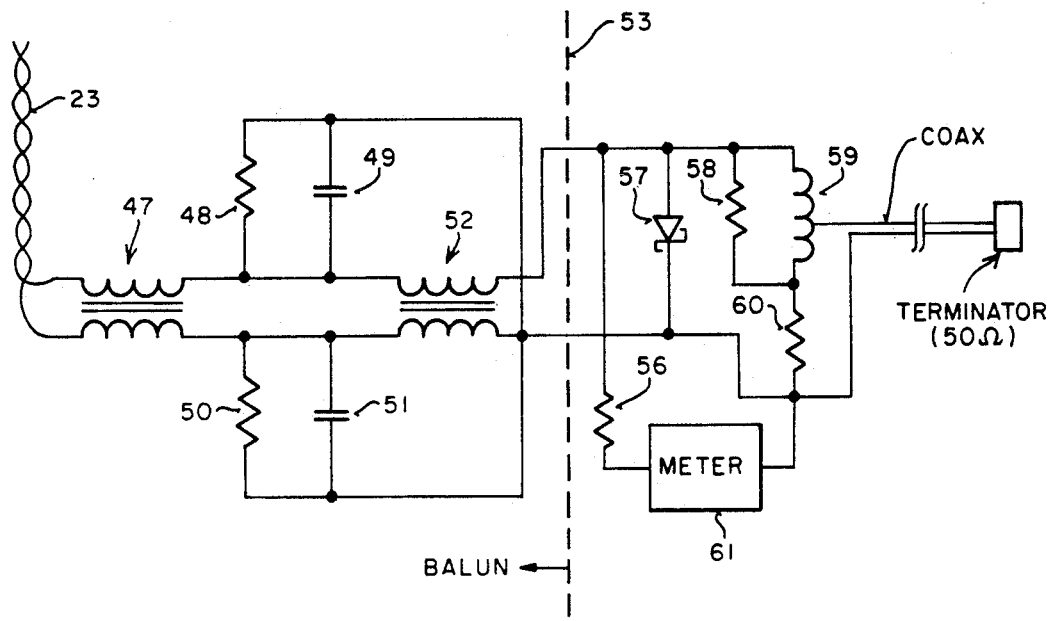
FIG_4
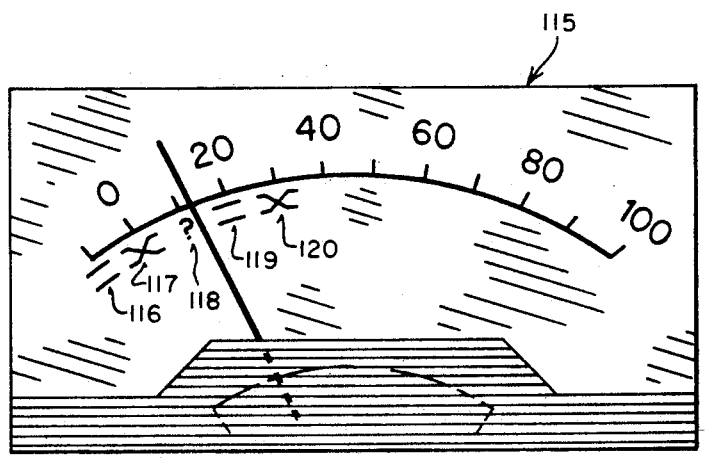
FIG_5

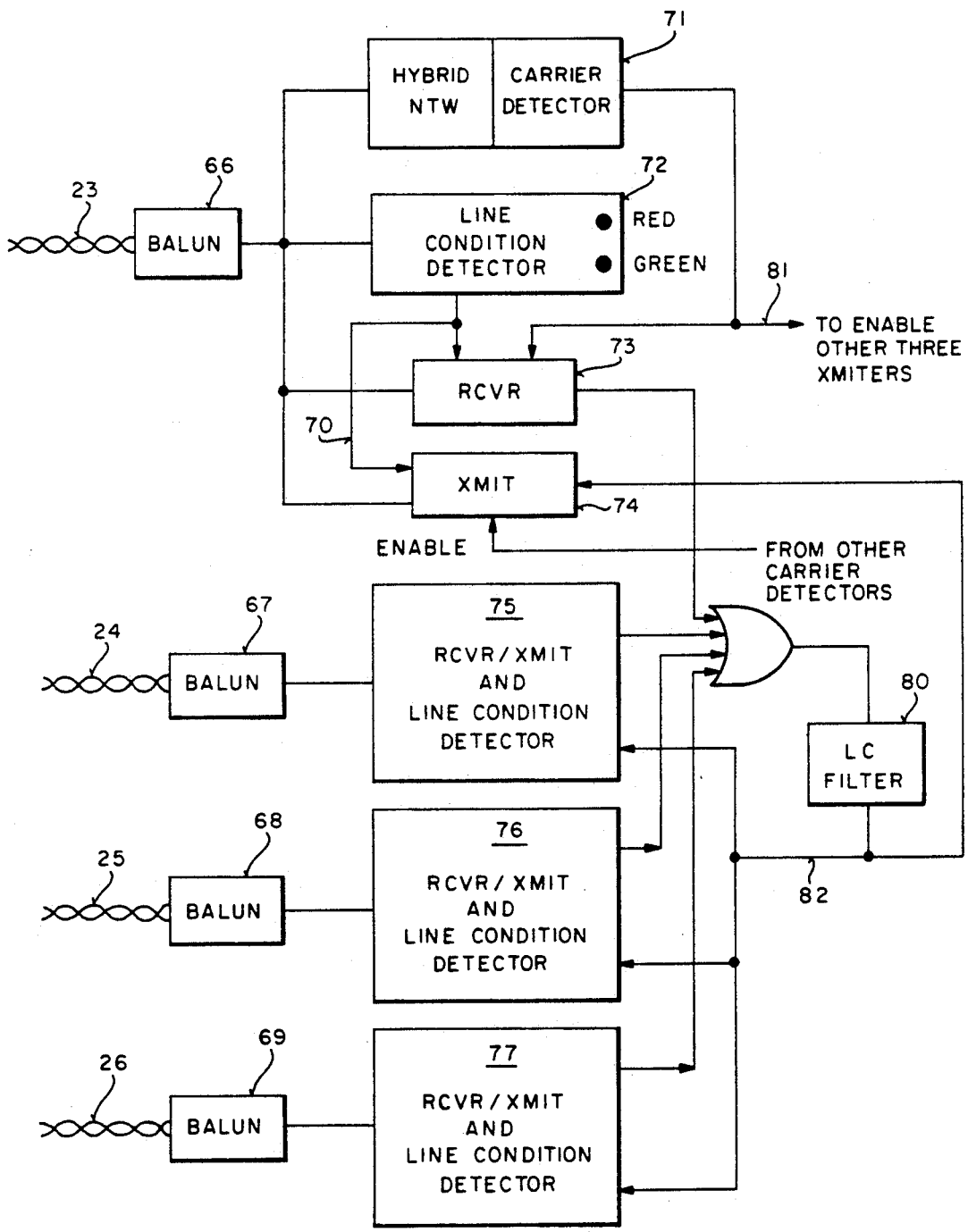
FIG_6

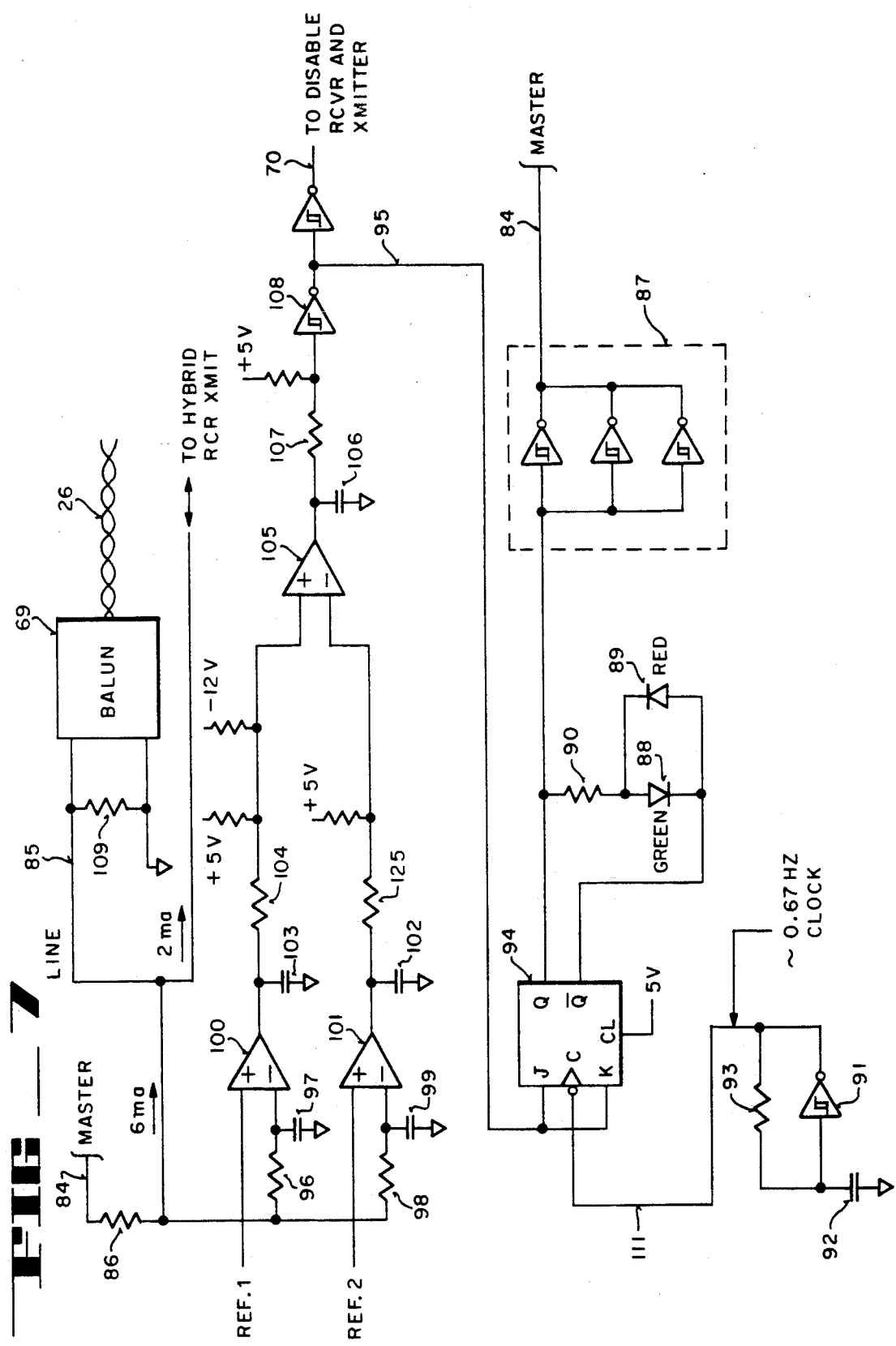

NETWORK MONITOR AND TEST APPARATUS

This is a continuation of application Ser. No. 07/731,634, filed Jul. 17, 1991, now abandoned.

BACKGROUND OF THE INVENTION

1. Field of the Invention

The invention relates to the field of testing and monitoring the integrity of lines, particularly twisted pair lines.

2. Prior Art

Twisted pair lines have been used for many years in telephony and countless buildings are wired, particularly in a star configuration, with twisted pair lines. It is a relatively expensive task to rewire structures to provide, for example, coaxial cable which is perhaps preferred for local area networks.

There are many commercially available systems which utilize twisted pair lines in local area networks such as in Ethernet networks. The general architecture of these systems is described in this application in order to set the environment in which the present invention is used.

There are existing techniques for monitoring and testing the integrity of twisted pair lines used in networks. *IEEE* 802.3 10 *BASET* describes a somewhat standard technique. Link test pulses are sent and received periodically to test the integrity of the line. These pulses are narrower than data so that they are not mistaken for data. One of the problems which occurs with this technique is that the pulses sometimes collide with data pulses thereby destroying the data pulses. Another problem is that in hub-to-hub connections, one hub must be a master (uplink/downlink) hub and so designated. As will be seen with the present invention, there is no master in a hub-to-hub connection.

As will be seen, the system of the present invention utilizes direct current voltages and currents for testing the lines, and thereby provides a less complicated, more reliable system.

SUMMARY OF THE INVENTION

An apparatus for monitoring and testing twisted pair lines in a network such as an Ethernet network is described. In the currently preferred embodiment, first and second DC currents are applied asynchronously to both ends of the line. One current is in the opposite direction of the other current. The potential on the line is compared to a predetermined potential. This predetermined potential is selected such that the condition of the line can be determined from the potential on the line. The condition of the line being intact and properly terminated is discernable from conditions such as crossed lines, improperly terminated lines, open lines and shorted lines. A DC meter is used to provide a visual indication of the condition of the line; the meter also indicates the traffic level in the network. Lights are used at the hub to indicate the condition of the line.

BRIEF DESCRIPTION OF THE DRAWINGS

FIG. 1 is a diagram of a line terminated in resistors. This diagram is used to describe problems with monitoring such lines.

FIG. 2a illustrates a line terminated in resistors and is used to describe the condition when the line is intact and correctly terminated.

FIG. 2b illustrates a line which is open. This diagram is used to describe the voltages on terminating resistors for the open line condition.

FIG. 2c illustrates a line which is shorted. This diagram is used to describe the voltage on the line for this condition.

FIG. 2d illustrates a line which is crossed. The diagram is used to describe the voltage on the line for this condition.

FIG. 2e illustrates a line with a DC current supplied at only one end. This diagram is used to describe the voltage across the line for this condition.

FIG. 2f illustrates a line with a DC current applied to only the other end of the line. This diagram is used to describe the voltage across the line for this condition.

FIG. 2g illustrates a line where 4 milliamp currents are applied to both ends of the line. This diagram is used to describe the voltage across the line for this condition.

FIG. 2h illustrates a line where 2 milliamp currents are applied to both ends of the line. This diagram is used to describe the voltage across the line for this condition.

FIG. 2i is a diagram illustrating a line terminated at one end in both a 100 ohm resistor and a 50 ohm resistor. This diagram is used to describe the voltage across the line for this condition.

FIG. 3 is a block diagram illustrating a network in which the present invention is used.

FIG. 4 is an electrical schematic of the currently preferred embodiment of the balun and meter circuit of FIG. 3.

FIG. 5 illustrates the face of the meter of FIG. 4.

FIG. 6 is a block diagram of one of the hubs illustrated in FIG. 3.

FIG. 7 is an electrical schematic of the currently preferred embodiment of one of the line condition detectors of FIG. 6.

DETAILED DESCRIPTION OF THE INVENTION

An apparatus and method is described for monitoring and testing a line, particularly a twisted pair line used in an Ethernet network. In the following description, numerous specific details are set forth such as specific resistance values, etc. in order to provide a thorough understanding of the present invention. It will be obvious to one skilled in the art that the present invention may be practiced without these details. In other instances, well-known circuit elements have been shown in block diagram form in order not to unnecessarily obscure the present invention in detail.

Specific resistor and capacitor values have been given below in many cases to assist in understanding the present invention. Also, where commercially available ICs are used, their commercial part numbers are given. Component values and part numbers are often given in parenthesis following the first mention in the specification of the component or part.

Principles Embodied in the Present Invention

It is not always easy to determine if a line such as a twisted pair line is intact (electrical continuity from end-to-end) and is terminated in resistors of predetermined values. Referring to FIG. 1, a twisted pair line 10 is illustrated terminated at one end in resistor 11 ($R_1$) and at the other end in resistor 12 ($R_2$). Assume a current $I_1$ is applied to one end of the line and a current $I_2$ to the other end, as illustrated in FIG. 1. If $I_1$ is equal to $I_2$ and $R_1$ is equal to $R_2$, the voltage across resistors 11 and 12 is the same if the line is open or intact. One monitoring the voltages at resistors 11 and 12 for the conditions described would not know if the line is open or intact. Accordingly, one cannot simply monitor any DC voltage on the line to determine the integrity of the line.

Referring to FIG. 2a, the technique for monitoring the line in accordance with the teachings of the present invention is illustrated. Again, a twisted pair line 15 is illustrated. The ends of the line are terminated in 100 ohm resistors 17 and 18. One end of the line receives a DC current of 4 milliamps and the other end of the line receives a DC current of 2 milliamps. As viewed from the ends of the line, the 4 milliamp current is in the opposite direction to that of the 2 milliamp current. If the line is intact the voltage across the line will be equal to $V_{R1}$, which will equal $V_{R2}$, and as shown in FIG. 2a, $V_{R1} = V_{R2} = +0.1$ volts. Note throughout the specification, direct currents are applied to the lines and the voltage on at least one end of the line is measured. In all cases DC voltages are measured. The DC currents are applied to the line for a sufficiently long period of time to allow the measurement of a DC voltage. That is, a stable voltage is measured—after the transients have died out.

In FIG. 2b the line 15 is again illustrated and this time the line is shown open. The 4 milliamp and 2 milliamp currents are again applied to opposite ends of the line. This time the voltage across resistor 17 is different than the voltage across resistor 18 and as shown in FIG. 2b, $V_{R1}$ is equal to 0.4 volts while $V_{R2}$ is equal to $-0.2$ volts. When comparing FIG. 2a to FIG. 2b it can be seen that for the selected currents, the open condition can be detected by monitoring the voltage at either end of the line since 0.1 volts for the correct condition is different than 0.4 volts or $-0.2$ volts.

In FIG. 2c the line 15 is again illustrated, this time with a short across the line. Once again, the same currents, 4 milliamp and 2 milliamp, are applied to the opposite ends of the line. The voltage across the resistors 17 and 18 as illustrated in FIG. 2c will be 0. Accordingly, the shorted condition can be distinguished from the open and correct conditions previously discussed.

In FIG. 2d the line 15 is again illustrated, this time the line is shown crossed between the resistors 17 and 18. Again, the 4 milliamp and 2 milliamp currents are applied to opposite ends of the line. The potential across resistor 17, $V_{R1}$, is 0.3 volts and the potential across resistor 18, $V_{R2}$, is $-0.3$ volts. Consequently, the crossed condition can be distinguished from the correct condition as well as from the open and shorted conditions.

FIG. 2e illustrates the condition where only the 2 milliamp current is applied to one end of the line 15, that is the 4 milliamp source is off. Once again, the potential across resistors 17 and 18 will be equal since the line is intact and not crossed and, as shown this potential is $-0.1$ volts. FIG. 2f illustrates a somewhat similar condition. This time, however, the 2 milliamp current is not present. Since the line is intact, the voltage across resistors 17 and 18 is equal and specifically, equal to 0.2 volts. FIGS. 2e and 2f illustrate that the condition of no current on either side can also be distinguished from the condition of FIG. 2a.

FIG. 2g illustrates the condition where the same current, specifically 4 milliamps is applied to both ends of the line 15. FIG. 2h illustrates the condition where 2 milliamps is applied to both ends of the line 15. In the case of the 4 milliamp current, the voltage across the line is 0.4 volts, and, in the case of 2 milliamp current the voltage across the line is $-0.2$ volts. Again the conditions of FIGS. 2g and 2h can be distinguished from the condition of FIG. 2a since there is sufficient difference between the voltages of FIGS. 2g and 2h and the voltage across the line for the condition of FIG. 2a.

FIG. 2i illustrates an additional condition where one end of the line 15 is terminated in resistor 17 and the other end of line 15 is terminated in resistors 18 and 19. FIG. 2i illustrates a typical twisted pair terminated at one end in a standard 100 ohm resistor and where the other end is coupled through a balun to a coaxial cable where the coaxial cable is terminated in 50 ohms. The parallel combination of resistors 18 and 19 provides 33 ohms. When the 4 milliamp current is applied to one end of the line 15, the voltage across the line is approximately 0.1 volts. That is the same voltage as shown in FIG. 2a. In the present invention, the currents have been selected so that with the condition of FIG. 2i, 0.1 volts results when one end of the line is terminated in both the 100 ohm and 50 ohm resistors. The condition shown in FIG. 2i provides the correct voltage across the line as seen at resistor 17 even when the line is crossed. The crossed line can be detected by using a non-linear circuit element. For example, if a diode is placed in series with the 50 ohm resistor the reversal or crossed condition of FIG. 2d can be detected.

In the above discussion, it has been assumed that the line 15 has no resistance. In a typical application, the resistance of the line is small when compared to the terminating resistors and hence, this assumed is justified. The same results as described above can be obtained when the resistance of the line is taken into account. Also as discussed above, except for FIG. 2i, both ends of the line are shown terminated in resistors of equal value (i.e., 100 ohms). The conditions discussed above can be detected where one end of the line is terminated in a different value resistor than the other end.

As will be discussed later, the present invention utilizes two currents as described above. For some lines, both ends of the line alternately receive the 4 milliamp and 2 milliamp currents. The currents at each end are asynchronous and consequently, the conditions of FIG. 2a quickly occur and can be detected if the line is intact and properly terminated. In other instances, only one end of the line receives, alternately, the 4 milliamp and 2 milliamp currents. The other end of the line when terminated in both the 100 ohm and 50 ohm resistors yield the 0.1 volts (the condition of FIG. 2i) which condition is detected.

Overall Network Using the Present Invention

Before describing the currently preferred embodiment of the invention as shown primarily in FIGS. 4 and 7, it will be helpful to understand the network in which the present invention is used. Referring to FIG. 3, an Ethernet network is shown which utilizes a plurality of twisted pair lines. These lines are often found installed in buildings in a star configuration since they are commonly used for telephones. For instance, the twisted pairs 23, 24, 25 and 26 originate at a common point and then branch out to different parts of a building. The same is also true for lines 27, 28 and 29. Each line, such as line 23, is coupled through a balun and meter 32 to one end of a coaxial cable 38. The other end of the coaxial cable is terminated in a terminator 39

(e.g., 50 ohms). The coaxial cable 38 is coupled to a plurality of transceivers which may be part of workstations, or the like, such as workstations 42 and 43. The other twisted pairs are coupled through their respective baluns and meters 33 through 37 to coaxial cables and other stations.

The signals transmitted onto coaxial cable 38 from, for example, workstation 42 are coupled through the balun and meter, and through line 23 to the hub 21. From there, they are retransmitted onto all the other twisted pairs, such as twisted pairs 24, 25 and 26. The signals on the line 26 is coupled to a hub 22 and retransmitted onto the lines 27, 28 and 29. In effect the coaxial cables, although interconnected through hubs, appear as one single continuous line. Therefore, by way of example, workstation 43 communicates directly with workstations associated with twisted pair 29 and balun and meter 37.

The overall network of FIG. 3 is well-known in the prior art. Applicant's invention is the apparatus and method for monitoring the integrity of the twisted pair lines and also for determining the amount of traffic on the network. Applicant's invention is used in the hubs 21 and 22 and also in the baluns and meters 32 through 37. In the currently preferred embodiment, a pair of lights are included in the hubs for each twisted pair. These lights as we will see, flash first red then green if the line is open, shorted, or not properly terminated. The lights will latch to either red or green when the line is intact and properly terminated. In the currently preferred embodiment of the invention, the meters provide a visual indication of the integrity of the line between the hub and baluns and also a visual indication of the level of traffic on the network.

Overview of the Hub

The hubs 21 and 22 of FIG. 3 may be identical units. One side is shown in FIG. 6. While the illustrated hubs have four channels each, it will be appreciated that the number of channels in the hub is not critical to the present invention. For instance, a hub can have only two channels and more resemble a repeater.

The hub of FIG. 6 receives the twisted pairs 23, 24, 25 and 26 each of which is coupled to a balun 66, 67, 68 and 69, respectively. The specific balun used is described in U.S. Pat. No. 4,717,896. Each balun is connected to a receiver, transmitter, hybrid network and carrier detector, and to a line condition detector, the latter is built in accordance with the present invention. In general, the hub is known in the prior art except for the line condition detectors used with each channel.

Each of the channels are identical, the channel associated with balun 66 is shown in more detail. The channel comprises a hybrid network and carrier detector 71, receiver 73 and transmitter 74. These components are well-known in the art. Also, there is a line condition detector 72, the currently preferred embodiment of which is shown in FIG. 7.

When a signal is received from the line 23, it is detected by detector 71. Detector 71 then enables the receiver 73 allowing it to receive the signal and to couple the signal to the OR gate 79. The output of the detector 71, shown as line 81, is also coupled to enable the transmitters of the other channels. The output of the gate 79 is coupled through a filter 80 to line 82. Line 82 is coupled to the input terminals of the four transmitters in the hub. Consequently, when a signal is received on line 23 it is coupled through the gate 79 and is retransmitted onto lines 24, 25 and 26 since the transmitters associated with receiver/transmitter 75, 76 and 77 will be enabled by the output of the carrier detector 71. Because transmitter 74 is not enabled, the signal from line 23 is not retransmitted on itself. Similarly, if a signal is received on line 25, it will be retransmitted onto lines 23, 24 and 26.

A signal is provided on line 70 from the detector 72 that prevents receiving or transmitting until detector 72 determines that line 22 is properly terminated. Specifically, as will be discussed, the signal on line 70 prevents receiving and transmitting until the detector is latched.

There is a detector such as detector 72, associated with each of the twisted pairs coupled to the hub. The detector 72, as will be described, alternately provides the 4 milliamp and 2 milliamp currents onto the line 23 and senses the potential across the twisted pair to enable the detection of the conditions of FIG. 2a and FIG. 2i as opposed to the other conditions set forth in FIG. 2. Also, as will be described, the red and green lights for each twisted pair alternately flash if the line is improperly terminated, open, shorted, etc. One of the lights remain on and the other off when the conditions corresponding to FIG. 2a or FIG. 2i are met.

Currently Preferred Embodiment of the Present Invention

Referring now to FIG. 7, the line condition detector 72 is shown in detail. As mentioned, there is an identical detector associated with each of the lines. In FIG. 7 the twisted pair 26 is coupled through the balun 69 to a line 85. Resistor 109 (120 ohms) is coupled between the line 85 and ground. From the standpoint of the line 23 the net effect of the various resistors coupled to the line, such as resistor 109, is that the line appears terminated in 100 ohms. The line 85 is coupled to the hybrid network/carrier detector, receiver, and transmitter.

Line 85 is also coupled to line 84 through resistor 86 (825 ohms). Line 84 identified as "MASTER" is generated at the output of the inverters 87. Line 84 alternates between 0 and 5 volts until the circuit of FIG. 7 latches as will be described later. When line 84 is coupled to 5 volts, a constant current of approximately 6 milliamps flows through resistor 86 from the 5 volt source. 2 milliamps of this current is drawn by the hybrid network since this circuit continually draws 2 milliamps. Thus, when line 84 is coupled to 5 volts, 4 milliamps of direct current is applied to line 85. When line 84 is coupled to ground, 2 milliamps is drawn from line 85 through the hybrid network. Accordingly, line 85 alternately receives 4 milliamps and 2 milliamps, the 2 milliamps being in the opposite direction of the 4 milliamps. These currents are substantially constant currents since, for example, resistor 86 has substantially more resistance than the line 26 and its terminators.

The line 85 is coupled to the comparator 100 and the comparator 101. Both comparators, as well as comparator 105 are part number LM339. The line is coupled to the negative input terminals of both comparators 100 and 101 through RC networks. Resistor 96 and capacitor 97 are associated with the input to the comparator 100; resistor 98 and capacitor 99 are associated with the input to the comparator 101. Resistors 96 and 98 are each 20 k ohms, capacitor 97 is 4700 pf and capacitor 99 is 47 pf. These RC networks provide filtering. Capacitor 97 is larger than capacitor 99 since the former rounds off spikes from the baluns occurring at the ends of packets; these spikes can effect the functioning of comparator 100.

The comparator 100 receives a DC reference potential of 190 millivolts on its positive input terminal. This comparator senses when the potential on the line is too high (e.g., line open). For a correct line, the potential on the line will be less than 190 millivolts.

The positive terminal of comparator 101 receives a reference potential of 40 millivolts. This comparator determines when the potential across the twisted pair is too low (e.g., shorted condition). Thus, for the correct conditions the potential on the line 85 must be greater than 40 millivolts but less than 190 millivolts.

The output of the comparator 100 is coupled to the comparator 105 through resistor 104 (200 k ohms). This line is also coupled to +5 volts through a 100 k ohm resistor and to a −12 volts through a 499 k ohm resistor. The output of comparator 100 is coupled to ground through capacitor 103 (0.01 µf). The output of comparator 101 is coupled to the input of comparator 105 through resistor 125; capacitor 102 is coupled to the output of the comparator 101. The values of the capacitor 102 and resistor 125 are the same as capacitor 103 and resistor 104, respectively. The output of comparator 101 is coupled to +5 volts through a 100 k ohm resistor.

The output of the comparator 105 is coupled to the JK terminals of a T flip-flop 94 through an inverter 108 (line 95). The inverter 108, as well as all the other inverters shown in FIG. 7 are part number 74HC14. These devices may be looked at as being Schmitt triggers in that they provide hysteresis. Resistor 107, which is coupled between the output of the comparator 105 and the input of inverter 108 has a value of 200 k ohms. Capacitor 106 has a value of 0.01 µf. The input to the inverter 108 is coupled to 5 volts through a 100 k ohm resistor.

The flip-flop 94 has the characteristic that if its JK terminals are high, the output toggles on each positive transition of the clock signal. Consequently, when the potential on line 95 is low, the flip-flop 94 is latched with either its Q terminal high or its Q terminal low. This occurs when the potential on the line 85 falls within the range of between 40 and 190 millivolts. When this occurs the potential applied to the positive input terminal of comparator 105 is approximately 2.17 volts and the potential applied to the negative input terminal of comparator 105 from comparator 101 is approximately −0.67 volts.

When the flip-flop 94 is latched, current will flow either through the diode 88 or the diode 89, through resistor 90 (681 ohms). When current flows through diode 88 a green light is illuminated; when current flows through diode 89 a red light is illuminated. The Q terminal of the flip-flop 94 is coupled through three inverters 87 to provide the master signal (0 or 5 volts on line 84).

The clock signal for the flip-flop 94 is generated through the inverter 91, capacitor 92 (0.1 µf) and resistor 92 (10M ohms). The clock signal on line 11 has frequency of approximately 0.67 Hz. The period of this signal is long enough to allow the line 26 to become stable with the DC currents of 4 milliamps or 2 milliamps. The oscillator formed by the inverter 91, resistor 93 and capacitor 92 does not have a consistent frequency from oscillator-to-oscillator. Thus, when the currents of 4 milliamps and 2 milliamps are applied to one end of a line, and another oscillator controls the application of the 4 milliamp and 2 milliamp currents to the other end of the line, the currents at opposite ends will not be synchronized. This is important to enabling the circuit to latch as will be described.

Assume that the other end of line 23 is connected to a circuit identical to that shown in FIG. 7. Initially, the flip-flop 94 is not latched and the Q and Q/outputs of the flip-flop toggle at a rate of 0.67 Hz. This causes the 4 milliamp and 2 milliamp currents to be alternately applied to line 85. On the other end of the line, the 4 milliamp and 2 milliamp currents are also being applied to the line. During this period of time, the lights on both ends of the line will alternate between red and green. At some point in time, the conditions of FIG. 2g may be present and for other periods of time the conditions of FIG. 2h may be present. Eventually, (typically within a few cycles) if the line is intact and properly terminated, the conditions of FIG. 2a will occur. When this happens, flip-flop 94 latches, as does the corresponding flip-flop on the other end of the line. One end of the line will have a green light and the other a red light. If the line is open, shorted or improperly terminated the conditions of FIG. 2a will not be met and the red and green lights will continually alternate on both ends of the line.

The Ethernet network, by definition, has a maximum packet length of 1.2 milliseconds. There must be at least a 9 microsecond dead time between packets. Also, the digital signals of Ethernet are either in the 0 or −2 volt state. The RC constants associated with the capacitors 102 and 103 are approximately 3 milliseconds. Thus, the outputs of the comparators 100 and 101 are, in effect, stored. Capacitor 103 stores the correct condition; capacitor 102 stores the incorrect (unlatched) condition. Consequently, if the circuit is latched, it remains latched during each packet; there is sufficient time between packets to re-establish the correct "latched" values provided the correct line conditions still exist. Otherwise, the circuit becomes unlatched.

Capacitor 106 also provides storage of the unlatched state. If the line 85 becomes bad, this capacitor is quickly pulled down because of the open collector transistor output stage in comparator 105.

The discussion above describe the condition when a twisted pair is connected between hubs; that is, the circuit of FIG. 7 is coupled to each end of the line. This is true for the twisted pair 26 of FIG. 3. Other lines will be connected at one end to a balun and meter which will be terminated in a terminator such as terminator 29 of FIG. 3. The presently preferred balun and meter are shown in FIG. 4. For sake of discussion, the line 23 of FIG. 3 is shown coupled to a balun; the balun is shown to the left of the dotted line 53. The balun comprises the transformers 47 and 52. Resistor 49 (4.99 k ohms) and capacitor 49 (47 pf) are coupled in parallel. Similarly, resistor 50 in capacitor 51 are coupled in parallel and have the same values as resistor 48 and capacitor 49, respectively.

One line of transformer 52 is coupled to a resistor 56 (5.76 k ohms), a diode 57 and resistor 58 (201 ohms). The meter 61 is connected between the resistor 56 and a resistor 60 (100 ohms).

The balun performs the function described in U.S. Pat. No. 4,171,896. The diode 57 is used to provide voltage protection and permit detection of the crossed line condition. The resistors 58 and 60, along with the transformer 59 provide a 2 to 1 impedance transformation. The transformer 59 is coupled to a coaxial cable which, when properly terminated, is terminated in a 50 ohm resistor. From the standpoint of the line 23, it sees 100 ohms in parallel with 50 ohms or 33 ohms. The other end of the line 23 is coupled to the hub where a circuit identical to the circuit of FIG. 7 is alternately applying the 4 milliamp and 2 milliamp currents. When the 4 milliamp current is applied, if the line is correct, the conditions of FIG. 2i are met and the latch 94 latches.

A meter 61 is shown coupled between the resistors 56 and 60 in FIG. 4. The face 115 of this meter is shown in FIG. 5. The meter may be an ordinary DC ammeter and in its currently preferred embodiment, its 0 volt position is shown coincident with the "?" symbol 118. When the needle rests at this position, there is no current through the meter. This is interpreted as no hub power or no connection between the hub and the balun meter. When the coaxial line of FIG. 4 is terminated in 50 ohms, the circuit of FIG. 7 will be latched and the potential across the line will be approximately 0.1 volts. For this condition, the needle will rest at 0. This corresponds to a voltage of +0.1 volts on the twisted pair. This is an indication to a user that the line is correctly terminated and the hub is on. If the lines are crossed, the needle will move between the crossed line icons 117 and 120 if the 50 ohm terminator is not in place. Once the terminator is in place, however, the needle will remain at "20", position 119. If there is no termination on the line, and assuming the line is not crossed, the needle will continually move between the parallel line icons 116 and 119.

When an Ethernet transmission occurs, the voltage on the line will be on average of −1 volt. −1 volt will produce a full scale deflection indicating 100 percent use of the line. The meter, in effect, averages the Ethernet signals and gives a direct read-out of the amount of traffic on the network. Therefore, with a single DC meter connected as shown, a user can determine the connectivity state of the line between the local coaxial cable and the hub, and also the amount of traffic on the line.

While a meter is shown above to provide a visual indication of the buffer level, an LED bar graph or other such device may be used. In systems where the signal used for the data has no DC content, the signal may be rectified and used as described above to provide an indication of the traffic level. In this case, the DC signal provided to the display is a time averaged or integrated signal.

Thus, an apparatus and method have been described which allows the monitoring of the condition of twisted pair lines in an Ethernet network. A single DC meter provides an indication of the condition of the line and the traffic level on the line. Lights are used at the hub to indicate whether lines are properly connected.

I claim:

1. A network monitoring and testing apparatus for coupling to a line having a first end and a second end, comprising:
   first current means for applying a first current to said first end of said line;
   second current means for applying a second current, different than said first current, to said second end of said line;
   comparator means for comparing the steady state potential on said line resulting from said currents from said first and second current means, to a predetermined potential, said predetermined potential being selected such that a determination is made by said comparator means of said line being intact and terminated in a predetermined resistance.

2. The apparatus defined by claim 1 wherein said predetermined potential is selected such that a determination can determine if said line is terminated in other than said predetermined value, is open, or is short circuited.

3. The apparatus defined by claim 1 including observable indicia which provides a visual indication of said determination.

4. The apparatus defined by claim 3 wherein said indicia comprises a meter.

5. The apparatus defined by claim 3 wherein said indicia comprises at least one light.

6. The apparatus defined by claim 1 wherein said first current means alternately applies said first current and a third current, said third current being approximately equal in magnitude to said second current, and, wherein said second current means alternately applies said second current and a fourth current, said fourth current being approximately equal in magnitude to said first current.

7. The apparatus defined by claim 6 wherein said first and third currents alternate relative to said second and fourth currents.

* * * * *